(12) United States Patent
Mayer (10) Patent No.: US 9,532,509 B2
(45) Date of Patent: Jan. 3, 2017

(54) FLOWER TRIMMER

(76) Inventor: Frank F. E. Mayer, Bad Duerkheim (DE)

( * ) Notice: Subject to any disclaimer, the term of this patent is extended or adjusted under 35 U.S.C. 154(b) by 269 days.

(21) Appl. No.: 13/577,591

(22) PCT Filed: Feb. 4, 2011

(86) PCT No.: PCT/EP2011/000512
§ 371 (c)(1),
(2), (4) Date: Oct. 22, 2012

(87) PCT Pub. No.: WO2011/095340
PCT Pub. Date: Aug. 11, 2011

(65) Prior Publication Data
US 2013/0205602 A1    Aug. 15, 2013

(30) Foreign Application Priority Data

Feb. 7, 2010  (DE) .................... 20 2010 001 947 U
Sep. 7, 2010  (DE) .................... 20 2010 012 285 U
Nov. 22, 2010 (DE) .................... 20 2010 015 625 U (51) Int. Cl.
*A01G 5/00*    (2006.01)
*A01G 3/00*    (2006.01)
*B26B 27/00*   (2006.01)

(52) U.S. Cl.
CPC . *A01G 3/00* (2013.01); *A01G 5/00* (2013.01); *B26B 27/00* (2013.01); *Y10T 83/741* (2015.04)

(58) Field of Classification Search
CPC ......... B26B 27/00; Y10T 83/741; A01G 5/00; A01G 1/00
USPC .... 30/278, 279.2–279.6, 280, 289, 314, 317
See application file for complete search history.

(56) References Cited

U.S. PATENT DOCUMENTS

| | | | |
|---|---|---|---|
| 2,472,528 A * | 6/1949 | Grimes ........................... 69/20 |
| 2,554,189 A * | 5/1951 | Hall ....................... A47J 17/06 |
| | | | 30/120.1 |
| 2,681,504 A | 6/1954 | Fox | |
| 2,806,325 A | 9/1957 | Fox | |
| 5,020,408 A * | 6/1991 | Idema ............................. 83/446 |
| D590,687 S | 4/2009 | Ireland | |
| D602,324 S | 10/2009 | Hancock et al. | |
| D603,665 S | 11/2009 | Trewartha et al. | |
| D637,883 S | 5/2011 | Yu Chen | |
| D654,767 S | 2/2012 | Mayer | |

(Continued)

FOREIGN PATENT DOCUMENTS

| | | |
|---|---|---|
| DE | 31 40 280 | 7/1982 |
| DE | 90 15 493 | 3/1991 |

(Continued)

*Primary Examiner* — Kenneth E. Peterson
*Assistant Examiner* — Nhat Chieu Do
(74) *Attorney, Agent, or Firm* — Norris McLaughlin & Marcus, P.A.

(57) ABSTRACT

A flower trimmer including a handle and a head connected thereto on which a blade with a cutting edge is disposed so that an end area of a flower stem brought against the cutting edge can be trimmed or cut off by a tensile force introduced at the handle. The head comprises an opening at the front end thereof through which opening the flower stem is inserted into the head substantially in the axial direction and directed past the blade. In the head, a cavity is provided next to the opening, the cavity being traversed by the blade.

19 Claims, 12 Drawing Sheets

(56) References Cited

U.S. PATENT DOCUMENTS

| | | | |
|---|---|---|---|
| 2004/0187314 A1* | 9/2004 | Johnson | 30/162 |
| 2005/0060898 A1* | 3/2005 | Tomassetti et al. | 30/527 |
| 2009/0064507 A1* | 3/2009 | Green | 30/339 |

FOREIGN PATENT DOCUMENTS

| | | |
|---|---|---|
| DE | 100 63 809 | 5/2002 |
| DE | 10 2004 040 153 | 2/2006 |
| DE | 20 2010 012 285 | 12/2010 |
| EP | 0 021 493 | 1/1981 |
| EP | 0 383 407 | 8/1990 |
| JP | 7-132026 | 5/1995 |
| JP | 10-5119 | 1/1998 |
| JP | 2003-018917 | 1/2003 |
| NL | 8104605 | 5/1982 |

\* cited by examiner

FLOWER TRIMMER

BACKGROUND OF THE INVENTION

A flower trimmer is known from DE 31 40 280 A1, which is designed as a hand-held device having a handle and a head with a blade to which the stem of a flower can be brought for cutting. The blade, or the cutting edge thereof, is disposed at an angle relative to the longitudinal axis of the handle, and a lateral slit is present between the blade and the handle, making it possible to introduce a flower stem into the slit from the side and to bring it up to the blade. By way of pulling, or introducing a tensile force at the handle in the direction away from the flower, an end area of the flower stem can be trimmed or cut. However, in the process, the flower stem can deviate laterally, resulting in an incomplete cut or unintended damage to the flower stem. Also it is quite difficult to trim or cut flowers that are already bound into a bouquet, and it can take a considerable amount of time to do so.

This is the basis for the object of the invention, which is to improve flower trimmers of the above type with little design effort so that trimming and/or cutting of flower stems can be done easily with ease of handling. Moreover, the ergonomics of bringing the flower stem to the blade and of cutting are to be improved upon.

SUMMARY OF THE INVENTION

The flower trimmer according to the invention is characterized by a simple and functional design and facilitates ease of handling. The flower stem is inserted substantially axially into an opening located at the free front end of the head and upon further insertion, and primarily upon cutting, the flower stems are prevented by the head from deviating laterally. In a simple manner, an end of a flower stem can easily be brought to the blade by way of the longitudinal guide provided in the head of the flower trimmer near the blade, and furthermore a proper cut can be reliably made as trimming and/or cutting is done at an angle. The term "trim", which is commonly used by expert florists, such as gardeners or flower vendors, and also by lay persons, includes the complete cutting off of the end of the flower stem, and if necessary a large part thereof, the cutting plane running at an angle relative to the longitudinal axis of the flower stem. The longitudinal guide is preferably designed as a groove which opens in the direction of the end of the head, wherein the blade or the cutting edge thereof is located above this groove. It is preferred for the handle, the narrowed region and the head to be made of plastic and to be made in a one-piece construction. It is advantageous for the blade to be disposed such that the longitudinal axis running through the handle runs at least approximately through the cutting edge, guaranteeing an optimum introduction of the manually-applied tensile force and preventing any unintended slippage, whether in the longitudinal direction or laterally, and achieving a smooth cut.

Furthermore, an incline or curve is preferably disposed near the longitudinal guide and/or groove in such a way as to facilitate the bringing of the flower stem up against the cutting edge. The curve or incline is disposed in the head and/or is the outlet and/or transition of the longitudinal guide to the outside. When the flower stem is inserted into the head, the flower stem is bent thereby in such a way that the flower stem is brought against the cutting edge like a spring. Proven to be particularly advantageous is an S curve or a double S corrugation or U-shaped guide which then also transitions to a double S guide, whereby a flower stem can be easily pulled and pushed in both directions. Due to the longitudinal guide, and in particular in combination with the above-mentioned incline or S curve or double S corrugation, handling is considerably improved, whereby no particular dexterity or experience is required. The blade is removably connected to the head of the flower trimmer, in particular by way of two screws or other connecting means and can thus be readily exchanged as necessary.

The blade can be designed in two versions, which can be connected to the head of the flower trimmer selectively. In the first version, the blade is of a width substantially equal to that of the head, and in a second version the blade extends out from the head on one side, the cutting edge being present there as well. The second version is suited for optimum handling when removing thorns and leaves, and also for performing slanted trimming, in particular when cutting off flower stems. The head comprises widened areas, at least near the blade and preferably to the side, for supporting or anchoring the screws or other connection elements of the blade, the widened areas being half-moon-shaped or bulbous. Aside from the opening and/or the longitudinal guide, the head has a closed and/or substantially smooth outer surface. This further improves handling, particularly for bound bouquets.

Special configurations and improvements are indicated in the following description of exemplary embodiments.

BRIEF DESCRIPTION OF THE DRAWINGS

The invention is explained in more detail below with the aid of the exemplary embodiments shown in the drawing. This explanation does not represent a limiting of the invention. Shown are.

DETAILED DESCRIPTION OF THE INVENTION

As shown in FIG. 1 to FIG. 4, the flower trimmer includes a handle 2, a narrowed area 4 and a head 6, these being manufactured in a single piece, in particular out of plastic. The flower trimmer, in particular the handle 2, are ergonomically shaped, and has a substantially smooth surface, wherein the outer contours are rounded in design and edges or abrupt transitions are, in particular, avoided. On the front side according to FIG. 1, a blade 8 with a cutting edge 10 is fastened to the head 6. At the front end 7 of the head 6 is an opening 11 followed by a cavity 12 that extends axially inward, the cavity being designed as a groove 12, in particular, that opens perpendicular to the longitudinal axis 18.

A flower stem can be pushed through the opening 11 into the cavity 12 in the axial direction, the cavity 12 forming a guide. According to the invention, the end of a flower stem can be inserted into the cavity or longitudinal guide 12 in the direction of arrow 14.

Figure 1:
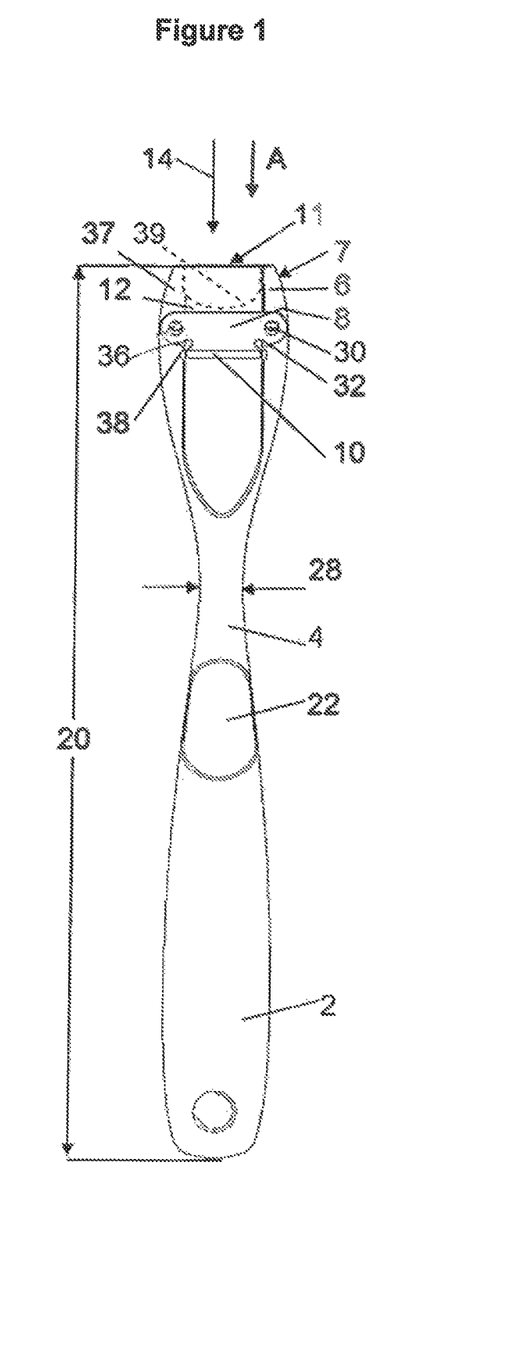
FIG. 1 is a view of the flower trimmer in the direction facing the front side.

The blade 8 traverses across the longitudinal guide 12 and is disposed at an angle 16 relative to the longitudinal axis 18 of the handle, the cutting edge 10 pointing in the direction of the handle 2. The angle 16 is specified to be in the range between 8 to 18°, preferably between 10 to 15°, in particular at least approximately in the range of 12°. The flower trimmer has a length 20 which is advantageously specified to be in the range of 12 to 18 cm, preferably in the range of between 14 to 17 cm and in particular at least approximately 15 cm. The handle 2 contains a concave depression 22 on the front side for the thumbs of a hand, wherein the cutting angle of the blade can be changed using more or less thumb pressure. It is useful for the depression to be ergonomically designed. The flower trimmer is sufficiently flexible and/or elastic due to the narrowed area ("connecting portion") 4 so that the head 6 can move relative to the handle 2 in a specified angle, as is indicated by arrow 24. It is useful for the cross-sectional area of the narrowed area to be of a half-moon, semi-circular, rectangular, U-shaped or oval design such that the material thickness 26 as viewed from the side (FIG. 2) is less than the material thickness ("width in a transverse direction") 28 as viewed from the front (FIG. 1). Alternatively, the narrowed area 4 can also be subdivided into multiple narrowings. The intended elasticity with regard to the mobility of the head 6 as described is specified as a result of the narrowed area 4 or multiple narrowings, respectively. On the other hand, sufficient stability is specified in the case of a laterally protruding blade, as described below with the aid of FIG. 5, the stability being specified for both right-handed and left-handed individuals, to prevent the lateral blade from deflecting backward away from the direction of pull during cutting and/or to prevent the blade from causing any unintended deviating movements.

The blade 8 is fixed in the head by way of fastening elements 30 designed essentially as screws that reach through associated holes 31 in the blade 8 so that the blade 8 can be removed from the head 6 and replaced if required. As can be seen in FIG. 1, the head 6 contains lateral expanded areas 32, preferably half-moon-shaped or bulbous, near the blade 8. The outer contour of the head 8 is substantially convex and/or rounded in the front area so that the flower trimmer can easily slide past adjacent flower stems in the case of bound bouquets. As is also evident from the side view (FIG. 2), the head 6 has a relatively minimal depth 34, likewise for the purposes of easily moving the head to flower stems in a bound bouquet.

The blade 8 contains a notch ("first notch") 36 between the cutting edge 10 and the supporting area on the head or on the expanded area 32 thereof. The notch 36 prevents any plant fibers from getting tangled between the blade and the material, in particular the plastic, of the head. For the same reason, the head 6 also advantageously contains a notch ("second notch") 38 in this area and/or to the side next to the cutting edge. It is also important that the blade 8 be made to be very thin, preferably having a thickness in the range of OA to 0.8 mm, in particular in the range of 0.15 to 0.6 mm. Such thin blades glide very easily through a flower stein, and are also very elastic, the elasticity helping to prevent breakage of the hard material, in particular of brittle razor knife steel.

In an alternative configuration, a quick-changing system is provided so that the blade can be fixed without a tool and without screws. In this system, the blade is placed into the head by bending it into an associated receptacle and forced into a final position where it is held by pulling it straight. Also, notches in the blade provide a secure seating of the blade in the head. Furthermore, film hinges or the like can be provided for purposes of attachment.

Figure 2:
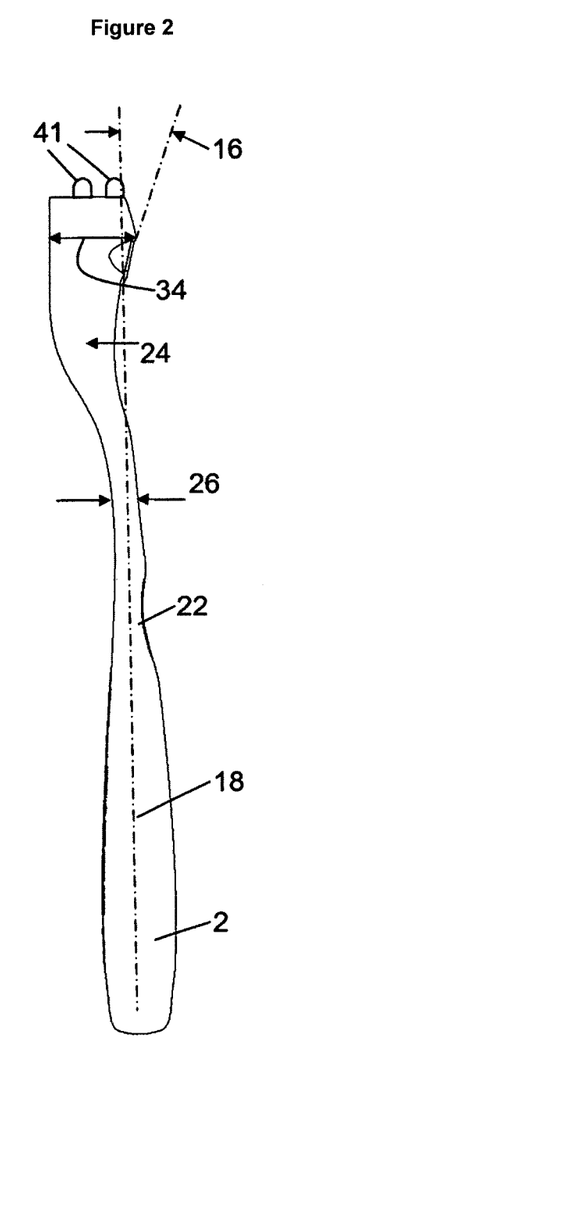
FIG. 2 is a side view.
Figure 3:
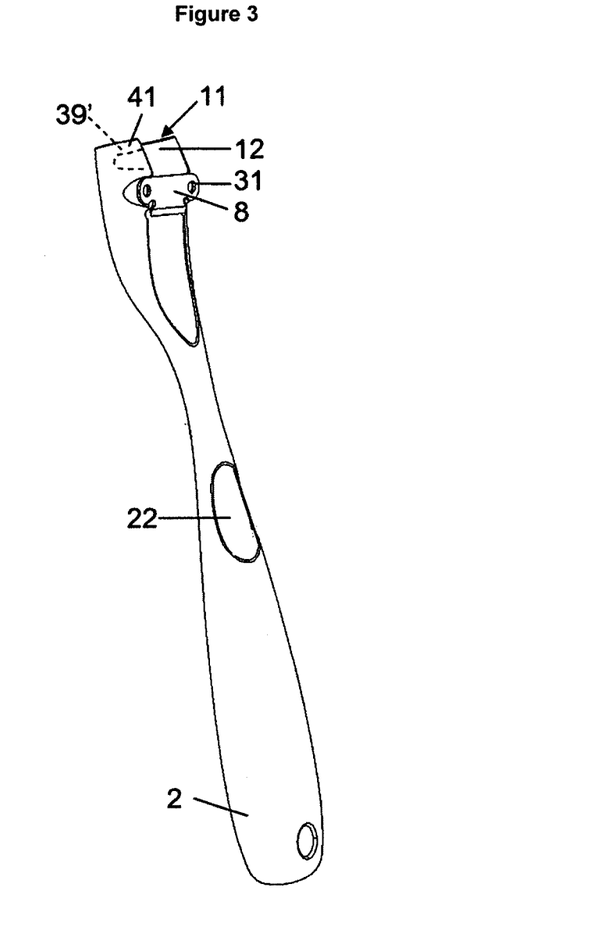
FIG. 3 is a perspective representation.
Figure 4:
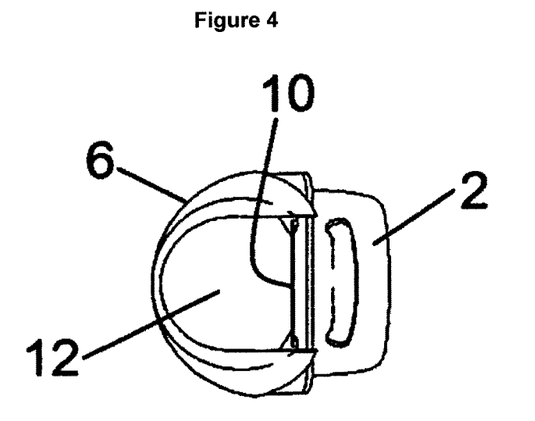
FIG. 4 is a view in the direction of the arrow A according to FIG. 1.

A special configuration of the invention is shown in FIGS. 1 to 3 by way of dashed lines, namely at least one or more indentations 39, 39' near the front end 7 of the head 6. These indentations 39, 39' completely penetrate the material of the head 6 at the front end 7 from the outer radial surface up to the cavity 12. The one or more indentations 39, 39" are preferred to have rounded contours, for example semi-circular contours according to FIG. 1, wherein parabolic or oval contours or the like can also be alternatively provided within the scope of the invention. Starting at the front edge of the head 6, the one or more indentations 39, 39' extend in the direction toward the handle 2. When there are at least two such indentations 39, 39' disposed next to one another relative to the longitudinal axis in the circumferential direction, webs 37 are disposed therebetween in the circumferential direction and/or facing in the direction of the cavity 12, the webs also being identified as lateral horns or teeth 41 relative to the longitudinal axis 18. Alternatively, within the scope of the invention, such webs 37 or teeth 41 can be made to protrude beyond the front edge of the head 6, as indicated in FIG. 2. By rotating the flower stem relative to the flower trimmer about longitudinal axis 18, thorns, in particular rose thorns, can advantageously be pushed off to the side and/or entirely removed.

Figure 5:
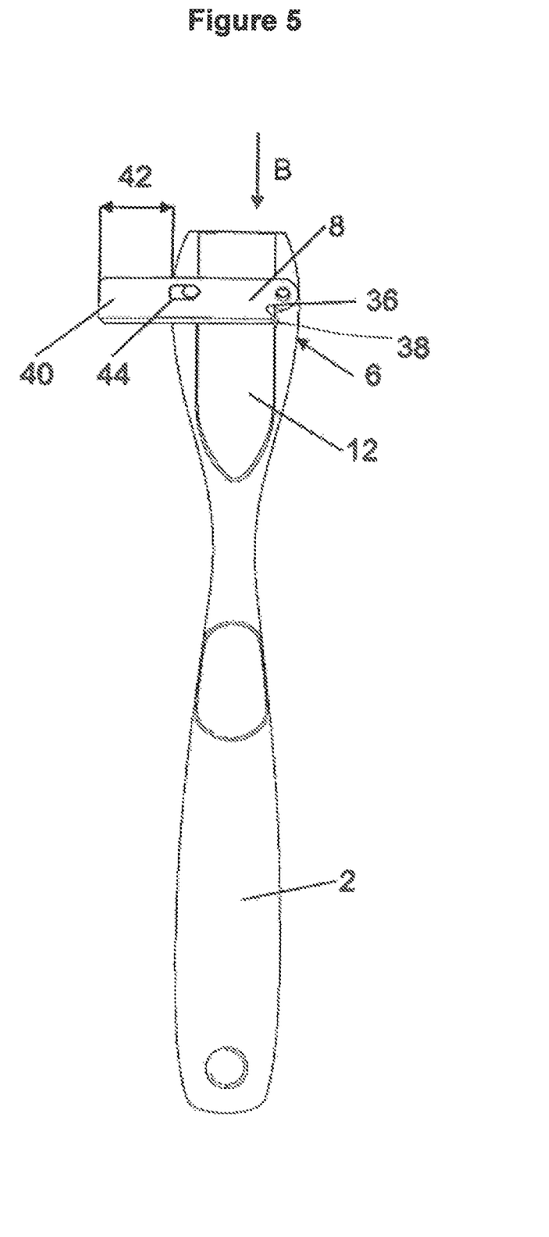
FIG. 5 is a view according to FIG. 1, but with a laterally lengthened blade.
Figure 6:
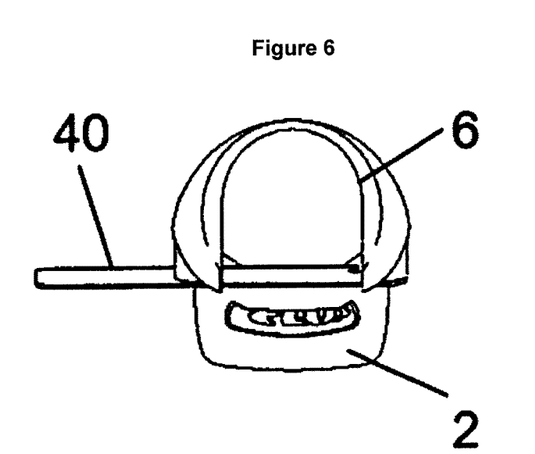
FIG. 6 is a view along the line of sight B according to FIG. 5.

FIGS. 5 and 6 show an embodiment whose blade 8 protrudes or a part 40 of which extends at a specified length 42 laterally beyond the outer contour of the head 6. This embodiment is particularly suitable for professional florists to allow them to remove leaves and thorns or to trim very thick-stemmed flowers. In contrast, the embodiment described initially is particularly suited for customers who receive from florists flowers or roses which in general have already been de-thorned, and who use the flower trimmer at home merely for shortening, in particular shortening bound bouquets. In this case, lateral extension would be a disadvantage and it would not be possible to prevent the risk of injury. In contrast, the embodiment including the extended blade, alternatively on both sides, is an advantage to a florist since he can ergonomically cut off leaves and shorten. In this regard, what is material to the invention is that the correctly tailored and designed blades can be fixed and/or fastened to the head of the flower trimmer for the respective application and purpose of use.

In connection with laterally extended blades, the half-moon-shaped or bulbous expanded area 32 is particularly important. It forms a stop for easily guiding the laterally protruding blade or part 40 thereof at various angles to the material to be cut and for more easily guiding the handle 2, which is substantially parallel to the flower stem. Furthermore, the flower trimmer is suitable both for right-handed and for left-handed individuals, even the version with the laterally extended blade, it being necessary to simply reverse the blades for this purpose.

The scope of the invention includes the blade being fastened flexibly and/or elastically on the head 6 by way of the fastening elements 30, in particular the screws at a distance to one another. This allows the blade 8 to bend, i.e. bend up, easily, which enlarges the inlet hole and/or the opening at the end of the head, and the blade 8 can bend around the flower stem. This provision also makes it easier to insert relatively thick flower stems. When it is pulled out, the blade can bend up in the opposite direction, causing the hole or opening to shrink thus facilitating the cutting process. The blade 8 is introduced concave into the flower stem during trimming, which also facilitates improved water absorption. Also, the notch 36 of the blade, as well as the minimal thickness of the blade 8, result in improved flexibility. In another configuration, the hole 44 associated with the extended part 40 of the blade 8 is designed as a slot for the screw, the slot being parallel to the cutting edge 10, thereby preventing the blade 8 from breaking in the case of particularly thin blade designs.

Figure 7:
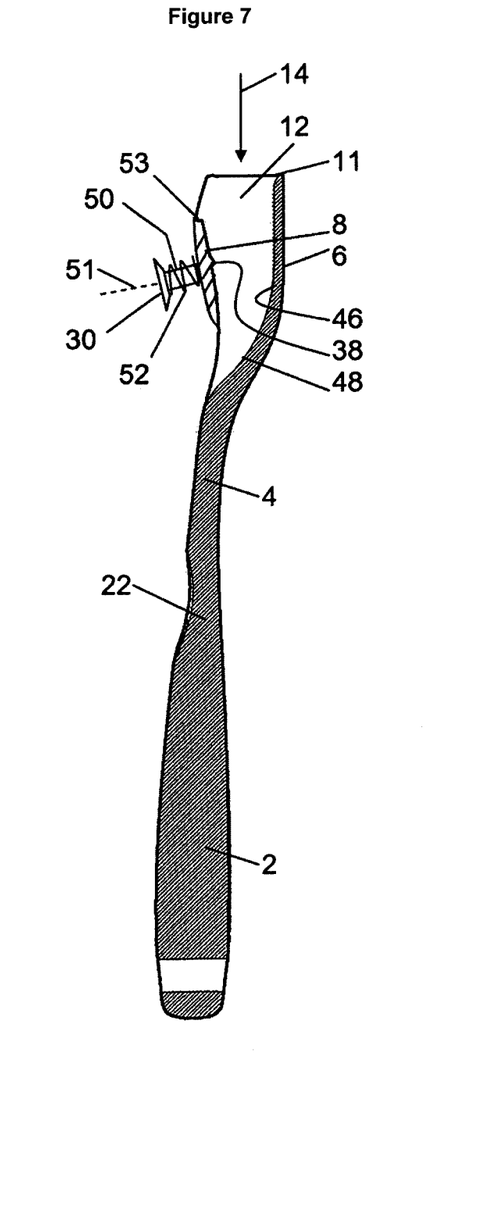
FIG. 7 is a longitudinal section through the flower trimmer.
Figure 8:
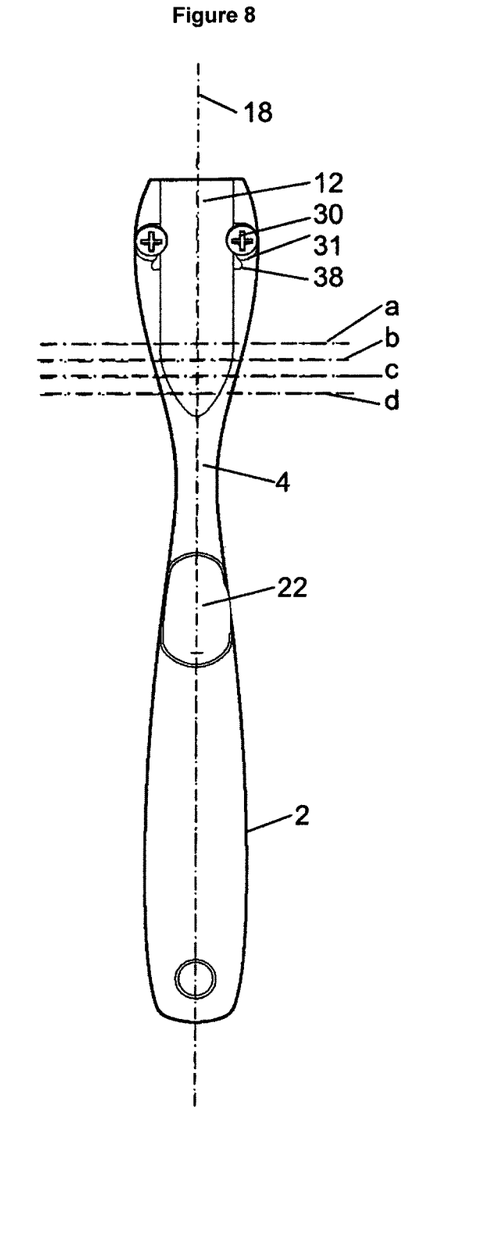
FIG. 8 is a view according to FIG. 1, but without a blade.
Figure 9:
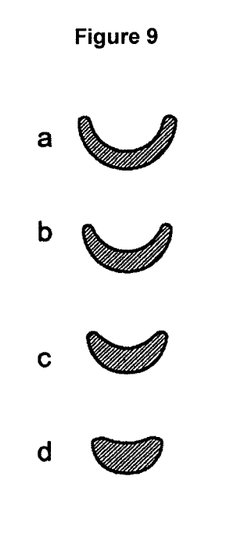
FIG. 9 is sections perpendicular to the longitudinal axis along cut lines a, b, c, d.

The special geometry of the longitudinal guide 12 is now further explained with the aid of FIG. 7 through 9. According to FIG. 7, which shows a section through a plane running through the longitudinal axis 18, the base ("floor") of the groove 46 is designed as a curve with an area 48 that is at an incline relative to the longitudinal axis 18 in the direction of the handle 2. The base 46 runs from the opening 11, preferably in substantially axial fashion, and then transitions largely continuously to the curve and the inclined area 48 of the base of 46. When introducing a flower stem in the direction of arrow 14, the end of the stem comes to the inclined and/or curved area 48, whereby the flower stem is bent and led to the blade, which is not shown here. As can also be seen in FIG. 8, in which the cutting planes a, b, c and d of the section shown in FIG. 9 are drawn, the radius of curvature decreases in the direction of the handle 2 in the sectional planes, which run perpendicular thereto. In other words, the longitudinal guide or groove 12, which has a substantially smooth depth and/or parallel side walls, rises up to the end thereof in the direction of the handle 2 in the inclined or curved area. This end is preferably located near the end of the head 6 or in the transition of the head 6 in the narrowed area 4.

Shown in FIG. 7 is a special improvement in the fastening of the blade 8, wherein the head 6 has a stud 50. The stud 50 penetrates the hole 31 in the blade 8 and protrudes above the outer surface of the blade 8 by a specified amount, as shown. A spring 52 is disposed between the head of the screw and the outer surface of the blade 8. Thus, the blade 8 does not sit in a fixed position, but can rock such that the blade can move radially outward and/or can rock and/or can make a rotating motion. The result is that flower stems whose diameters and/or thicknesses are larger than the distance between the base of the cavity 12 and the blade 8 pressed against the head 6 by the spring 52 can be introduced into the cavity 12, since the blade 8 can deviate radially outward against the force of the spring.

In another advantageous embodiment, the blade without the above-mentioned stud is not solidly fixed, but rather is also able to rock relative to the head 6. Here, the head of the screw does not sit completely against the outer surface of the blade, but is located at a specified short distance to the outer surface of the blade 8 such that movement of the blade 8, in particular a rotating motion, is likewise facilitated. The pivot point of the blade 8 is preferably specified substantially by the undercut 53 of the head 6. It is useful for the screw to have no threads below the screw head near the specified distance, and preferably also near the blade 8, so as not to diminish the mobility of the blade 8 as described. In this embodiment as well, the pivot point of the blade 8 is preferably indicated by said undercut 53.

Figure 10:
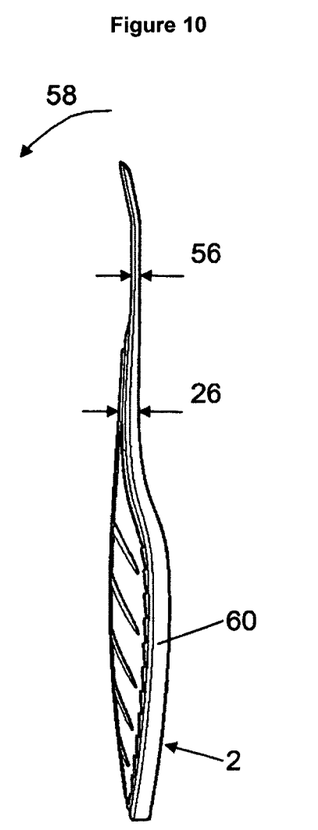
FIGS. 10-12 are views of a special configuration of the flower trimmer according to the invention.
Figure 11:
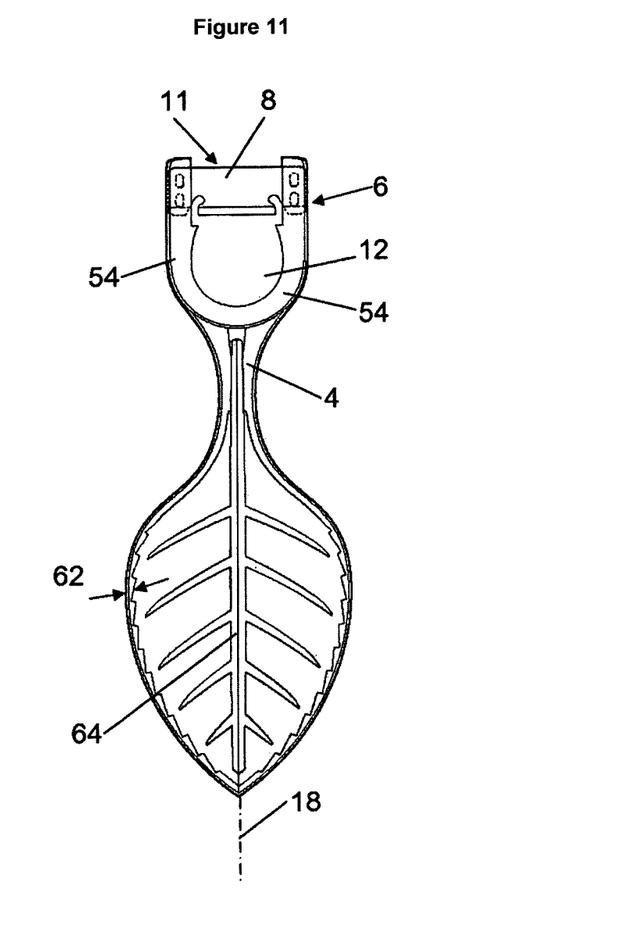

FIGS. 10 and 11 show a side view and a view in the direction toward the front side of a special configuration of the flower trimmer. The handle 2 is designed in the shape of a flower leaf and/or transitions upward, i.e. toward the middle of the longitudinal length, to the narrowed area 4. The head 6 is designed as a fork and/or substantially and/or approximately U-shaped, wherein the blade 8 is disposed at the upper or front end 7. The head or fork with the sides 54 are designed to be very thin as is directly seen from the side view according to FIG. 10, and have a relatively low stiffness, particularly when compared to the handle 2. Aside from the metal blade, the flower trimmer is made of an elastic and/or rigid to elastic material. Possible materials that are preferred include strong and/or elastic and/or resilient plastics, in particular such as POM, fiberglass-reinforced PA, pure PA or PP. It is particularly significant that a direction of bending 58 is specified by the thin design and/or the minimal material thickness 56 of the head 6 according to the side view 10. The angle of the blade 8 and/or the cutting edge 10 thereof can be varied by the tilting of a flower and/or the thin water thickness and/or the material, which results in an optimum cutting angle. According to the invention, due to the thin wall thickness and/or due to the and/or resilient design or specification of the material, in particular the plastic or metal, the trim angle at the flower to be trimmed is specified and/or varied by specifying the leverage introduced by the handle 2. It is of particular note that the tip and/or cutting edge 10 of the blade 8 is preferably aligned with the head 6 and/or the sides 54, wherein the latter straighten when a tensile force is applied.

The flower trimmer according to the invention is characterized by minimal wall thicknesses and/or material thicknesses, whereby production costs are advantageously reduced. As a result of the thin wall thickness and/or in combination with the resilient and/or elastic material, in particular the plastic, the trim angle of the flower to be trimmed can be specified and/or varied by the leverage imparted by the handle. In a preferred manner, the handle 2 contains an edge 60 that protrudes substantially squared-off from the remaining surface, the edge also having the minimal wall thickness 62. As can be seen in FIG. 10, the preferably leaf-shaped handle 2 is designed to be bulged relative to its surface. Thus, the handle 2 is considerably stiffer than the narrowed area 4 and/or head 6. Moreover, the handle 2 advantageously contains ribs 64 which are designed as depressions and/or ridges relative to the surface and which thereby additionally increase the stiffness, or are an alternate means of increasing the stiffness. The other explanations of the above exemplary embodiments apply analogously.

Figure 12:
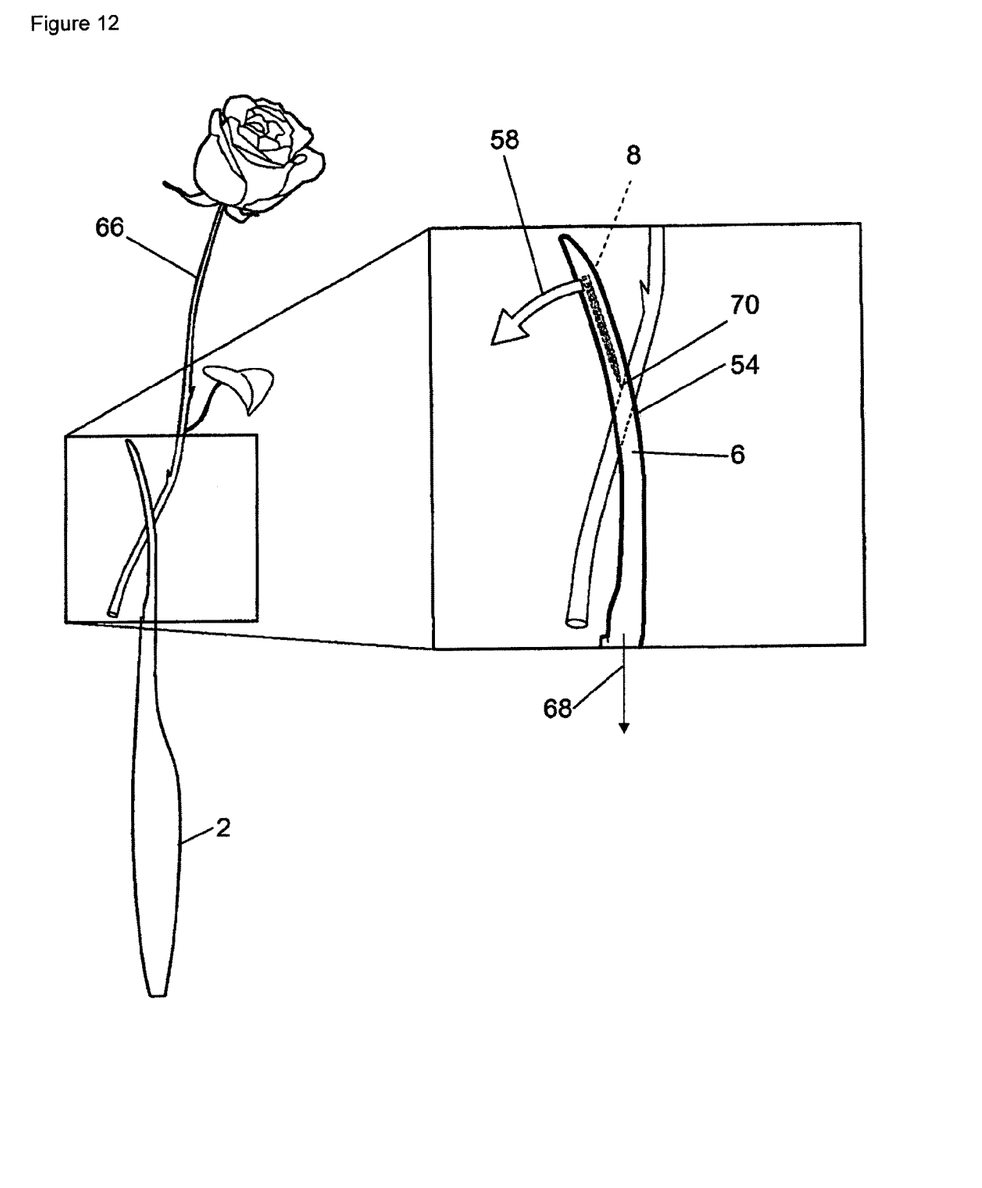

FIG. 12 shows the flower trimmer to the left together with a schematically indicated flower 66, wherein the area of the head 6 with the flower stem introduced is shown enlarged to the right. When a tensile force is exerted onto the flower stem in the direction of the arrow 68 during trimming, the flower trimmer, i.e. the head 6, is bent in bending direction 58. It is of particular note that the tip 66 of the blade 8 aligns with the sides 54. Here, the cutting edge of the blade can be designed to be inclined at a specified angle, wherein this angle can be specified to be preferably in the range of 12° degrees plus or minus 5° degrees.

It is specifically emphasized that each feature explained with the help of one of the exemplary embodiments can also be prescribed for every other exemplary embodiment within the scope of the invention in an obvious manner and/or as the respective requirements and/or purpose of use demand. Every combination of the individually explained features suitable for solving the underlying problem is an object of the invention.

The invention claimed is:

1. A flower trimmer, comprising a body and a blade, the body extending in a longitudinal direction, the body consisting of a handle portion at one end, a head having a head portion at a second end, and a connecting portion between the handle portion and the head portion;

wherein the head portion has an opening at said second end, said opening extending longitudinally to define a groove open at a front side of the head portion, a rear side of the head portion being rounded in a transverse direction, said opening and said groove being configured so that a flower stem can be inserted into the head portion substantially in a longitudinal direction of the flower stem along the groove;

wherein the blade is fastened to the head portion at said front side to cover a portion of said groove, the blade having a cutting edge disposed away from said opening toward said handle portion, the body and the blade together configured so that a flower stem brought against the cutting edge can be trimmed or cut off by a tensile force introduced at the handle portion;

wherein walls of the groove define a guide surface for said flower stem during insertion of the flower stem through said opening;

wherein a surface of the body at the head portion of the body, which surface of the body forms a floor of said groove, has a profile in the longitudinal direction which is convex at a portion thereof including a free edge area of the head and is concave at a portion contiguous with the convex portion and is of decreasing depth in the longitudinal direction from a portion of the groove underlying the cutting edge to an end of the head portion toward the connecting portion, and, between the blade and the connecting portion, a portion of the groove tapers in both depth and width in direction of the connecting portion; and wherein the handle portion is longer than the head portion, and the connecting portion has a smaller width than the head portion in a transverse direction.

2. The flower trimmer according to claim 1, wherein the opening lies in a plane substantially perpendicular to a longitudinal axis of the flower trimmer such that an outward movement or shift in a lateral direction with respect to the longitudinal axis is prevented.

3. The flower trimmer according to claim 1, wherein the blade is disposed to extend into the groove with the cutting edge being a furthest portion of the blade extending into the groove.

4. The flower trimmer according to claim 1, wherein the head portion comprises at least two expanded areas disposed diametrically opposite one another in a transverse direction at the front side for receiving fastening elements of the blade, wherein the expanded areas are half-moon shaped or bulbous and the head portion has a substantially U-shaped cross-section at least at a first portion of the head portion where the blade is disposed.

5. The flower trimmer according to claim 4, wherein the blade has attachments and a suspension, and wherein a material of the blade adjacent the fastening elements for the blade is thin so that a spacing of the attachments and suspension of the blade are flexible.

6. The flower trimmer according to claim 1, wherein the head portion comprises a notch lateral to the cutting edge and/or that the head portion comprises at least one indentation and web at said second end.

7. The flower trimmer according to claim 1, wherein the handle portion comprises an indentation so that a sufficient flexibility and elasticity is provided at said connecting portion such that a cutting angle of the blade can be changed by a pressure force acting in an area of the concave depression, said force being applicable by a thumb of a user.

8. The flower trimmer according to claim 1, wherein the connecting portion is half-moon-shaped, semi-circular, rectangular, U-shaped or oval-shaped in cross-section so that a material thickness as seen from a lateral side is less than that as seen from a front side and/or that the connecting portion is subdivided into two or more narrowings.

9. The flower trimmer according to claim 1, wherein the blade is connected to the head by a quick-changing system, the blade being placeable into the head through bending and being pulled straight to a final position, studs being provide in the material of the head, and the blade comprises corresponding notches so as to be attachable to the head by way of film hinges and a spring is disposed between the blade and the head.

10. A flower trimmer, comprising a body and a blade, the body being of one piece unitary construction extending in a longitudinal direction, the body consisting of a handle portion at one end, a head portion at a second end, and a connecting portion between the handle portion and the head portion;

wherein the head portion has an opening at said second end, said opening extending longitudinally to define a groove open at a front side of the head portion, a rear side of the head portion being rounded in a transverse direction, said opening and said groove being configured so that a flower stem can be inserted into the head portion substantially in a longitudinal direction of the flower stem along the groove;

wherein the blade is fastened to the head portion at said front side to cover a portion of said groove, the blade having a cutting edge disposed away from said opening toward said handle portion, the body and the blade together configured so that a flower stem brought against the cutting edge can be trimmed or cut off by a tensile force introduced at the handle portion;

wherein walls of the groove define a guide surface for said flower stem during insertion of the flower stem through said opening;

wherein said groove has an S-curve profile in the longitudinal direction and is of decreasing depth in the longitudinal direction from a portion of the groove underlying the cutting edge to an end of the head portion toward the connecting portion, said walls of the groove having increasing thickness from said portion of the groove underlying the cutting edge to said end of the head portion toward the connecting portion; and wherein a longitudinal profile of the groove is configured to provide an incline or curve including said S-curve profile enabling the flower stem to be brought up against the cutting edge, said longitudinal profile comprising a double-S corrugation and a lateral, substantially semi-circular guide portion of the groove which transitions to a double-S guide portion of the groove.

11. The flower trimmer according to claim 1, wherein the blade is placed at a specified angle relative to a longitudinal axis of the flower trimmer, the angle being specified in the range between 10 to 15°, and wherein the cutting edge faces in the direction of the handle portion.

12. The flower trimmer according to claim 1, wherein the blade comprises a protruding part comprising a slot on a side of said protruding part, the slot being provided for fastening using a fastening element, and said slot running substantially parallel with the cutting edge.

13. The flower trimmer according to claim 1, wherein the cutting edge comprises a notch.

14. The flower trimmer according to claim 1, wherein the blade comprises an extended part on at least one side thereof, said extended part protruding beyond the head at a specified length and being connected with the head.

15. The flower trimmer according to claim 1, wherein the blade comprises a thickness in a range of 0.15 to 0.6 mm.

16. The flower trimmer according to claim 1, wherein the blade has a first notch spanning in the transverse direction from the cutting edge of the blade to a supporting area of the head that supports the blade; and wherein the head portion has a second notch along a partial length of the head portion, the second notch extending in a transverse direction from the groove, and being located longitudinally in an area of the first notch.

17. The flower trimmer according to any one of claims 1, 2, 3, 10, 6, 7, and 8, wherein the blade has fastening elements, attachments and a suspension, and wherein a material of the blade adjacent the fastening elements is thin so that a spacing of the attachments and suspension of the blade are flexible.

18. A flower trimmer, comprising a body and a blade, the body being of one piece unitary construction extending in a longitudinal direction, the body consisting of a handle portion at one end, a head portion at a second end, and a connecting portion between the handle portion and the head portion;

wherein the head portion has an opening at said second end, said opening extending longitudinally to define a groove open at a front side of the head portion, a rear side of the head portion being rounded in a transverse direction, said opening and said groove being configured so that a flower stem can be inserted into the head portion substantially in a longitudinal direction of the flower stem along the groove;

wherein the blade is fastened to the head portion at said front side to cover a portion of said groove, the blade having a cutting edge disposed away from said opening toward said handle portion, the body and the blade together configured so that a flower stem brought against the cutting edge can be trimmed or cut off by a tensile force introduced at the handle portion;

wherein walls of the groove define a guide surface for said flower stem during insertion of the flower stem through said opening;

wherein said groove has an S-curve profile in the longitudinal direction and is of decreasing depth in the longitudinal direction from a portion of the groove underlying the cutting edge to an end of the head portion toward the connecting portion; and wherein a longitudinal profile of the groove is configured to provide an incline or curve including said S-curve profile enabling the flower stem to be brought up against the cutting edge, said longitudinal profile comprising a double-S corrugation and a lateral, substantially semi-circular guide portion of the groove which transitions to a double-S guide portion of the groove.

19. A flower trimmer, comprising a body and a blade, the body being a single piece of a same material extending in a longitudinal direction, the body consisting of a handle portion at one end, a head having a head portion at a second end, and a connecting portion between the handle portion and the head portion;

wherein the head portion has an opening at said second end, said opening extending longitudinally to define a groove open at a front side of the head portion, a rear side of the head portion being rounded in a transverse direction, said opening and said groove being configured so that a flower stem can be inserted into the head portion substantially in a longitudinal direction of the flower stem along the groove;

wherein the blade is fastened to the head portion at said front side to cover a portion of said groove, the blade having a cutting edge disposed away from said opening toward said handle portion, the body and the blade together configured so that a flower stem brought against the cutting edge can be trimmed or cut off by a tensile force introduced at the handle portion;

wherein walls of the groove define a guide surface for said flower stem during insertion of the flower stem through said opening;

wherein a surface of the body at the head portion of the body, which surface of the body forms a floor of said groove, has a profile which is convex at a portion thereof including a free edge area of the head and is concave at a portion contiguous with the convex portion in the longitudinal direction and is of decreasing depth in the longitudinal direction from a portion of the groove underlying the cutting edge to an end of the head portion toward the connecting portion, and, between the blade and the connecting portion, a portion of the groove tapers in both depth and width in direction of the connecting portion; and wherein the handle portion is longer than the head portion, and the connecting portion has a smaller width than the head portion in a transverse direction;

wherein the blade has a first notch spanning in the transverse direction from the cutting edge of the blade to a supporting area of the head that supports the blade; and wherein the head portion has a second notch along a partial length of the head portion, the second notch extending in a transverse direction from the groove, and being located longitudinally in an area of the first notch.

\* \* \* \* \*